United States Patent
Lakemond et al.

(10) Patent No.: US 10,885,376 B2
(45) Date of Patent: Jan. 5, 2021

(54) MATCHING LOCAL IMAGE FEATURE DESCRIPTORS IN IMAGE ANALYSIS

(71) Applicant: Imagination Technologies Limited, Kings Langley (GB)

(72) Inventors: Ruan Lakemond, Cheltenham (AU); Timothy Smith, London (GB)

(73) Assignee: Imagination Technologies Limited, Kings Langley (GB)

( * ) Notice: Subject to any disclaimer, the term of this patent is extended or adjusted under 35 U.S.C. 154(b) by 84 days.

(21) Appl. No.: 16/376,003

(22) Filed: Apr. 5, 2019

(65) Prior Publication Data
US 2019/0311214 A1   Oct. 10, 2019

(30) Foreign Application Priority Data

Apr. 5, 2018  (GB) .................................. 1805688.7

(51) Int. Cl.
| | |
|---|---|
| G06K 9/62 | (2006.01) |
| G06T 7/73 | (2017.01) |
| G06K 9/00 | (2006.01) |
| G06T 7/593 | (2017.01) |
| G06K 9/46 | (2006.01) |
| G06K 9/20 | (2006.01) |

(52) U.S. Cl.
CPC ....... G06K 9/6202 (2013.01); G06K 9/00664 (2013.01); G06K 9/209 (2013.01);
(Continued)

(58) Field of Classification Search
CPC ............... G06K 9/6202; G06K 9/6215; G06K 2009/6213; G06K 9/00664; G06K 9/4609;
(Continued)

(56) References Cited

U.S. PATENT DOCUMENTS

2002/0012460 A1* 1/2002 Kochi ................... G01C 11/06
382/154

2005/0002559 A1* 1/2005 Terauchi ................. G06T 7/593
382/154
(Continued)

FOREIGN PATENT DOCUMENTS

| | | |
|---|---|---|
| CN | 106203342 A | 12/2016 |
| CN | 107730543 A | 2/2018 |

(Continued)

OTHER PUBLICATIONS

Wei et al. "A Fast and Accurate Stereo Matching Algorithm Based on Epipolar line Restriction." Congress on Image and Signal Processing, May 27, 2008, pp. 271-275 (Year: 2008).*

Yu-Ning et al. "A Fast and Effective Stereo Matching Method—Implementational Aspects." 9th International Conference on Pattern Recognition, May 14, 1988, pp. 669-671 (Year: 1988).*

Primary Examiner — Jon Chang
(74) Attorney, Agent, or Firm — Potomac Law Group, PLLC; Vincent M DeLuca

(57) ABSTRACT

A method of feature matching in images captured from camera viewpoints uses the epipolar geometry of the viewpoints to define a geometrically-constrained region in a second image corresponding to a first feature in a first image; comparing the local descriptor of the first feature with local descriptors of features in the second image to determine respective measures of similarity; identifying, from the features located in the geometrically-constrained region, (i) a geometric best match and (ii) a geometric next-best match to the first feature; identifying a global best match to the first feature; performing a first comparison of the measures of similarity for the geometric best match and the global best match; performing a second comparison of the measures of similarity for the geometric best match and the geometric next-best match; and, if thresholds are met, selecting the geometric best match feature in the second image.

20 Claims, 6 Drawing Sheets

(52) U.S. Cl.
CPC ......... *G06K 9/4609* (2013.01); *G06K 9/4671* (2013.01); *G06K 9/6215* (2013.01); *G06T 7/593* (2017.01); *G06T 7/73* (2017.01); *G06K 9/00624* (2013.01); *G06K 2009/6213* (2013.01); *G06T 2207/20164* (2013.01)

(58) Field of Classification Search
CPC .. G06K 9/4671; G06K 9/00624; G06K 9/209; G06T 7/246; G06T 7/593; G06T 7/73; G06T 2207/20164; H04N 7/181; H04N 2013/0074; H04N 2013/0081
See application file for complete search history.

(56) References Cited

U.S. PATENT DOCUMENTS

2013/0258064 A1\* 10/2013 Bae .................... G06T 7/593
 348/47
2016/0188994 A1\* 6/2016 Wu .................... G06T 7/593
 382/195

FOREIGN PATENT DOCUMENTS

| EP | 3343435 A1 | 7/2018 |
|----|------------|--------|
| WO | 91/19265 A1 | 12/1991 |
| WO | 2018125939 A1 | 7/2018 |

\* cited by examiner

MATCHING LOCAL IMAGE FEATURE DESCRIPTORS IN IMAGE ANALYSIS

BACKGROUND

The present disclosure relates to a method and data processing system for matching features identified in images captured from camera viewpoints related by an epipolar geometry.

Many image processing systems are able to match features in one image to features in another image. To give just two examples, camera pipelines may perform feature matching in a sequence of images captured by a camera so as to enable autofocus points to track objects in the scene as the camera moves relative to the scene, and stereoscopic camera systems may perform feature matching in a pair of images captured by a pair of cameras so as to identify corresponding features and so enable depth information to be extracted from the combined images.

Various feature detection algorithms—sometimes termed saliency functions—exist to identify features suitable for tracking between images. Often such algorithms are used to detect high contrast features in an image which are well localised and so more reliably identified than areas of low contrast. In particular, high contrast features are more likely to be consistently identified in images of a scene as the viewpoint of one or more cameras capturing the scene changes. In order to identify high contrast features, algorithms may be used which perform edge and/or corner detection in the pixel data of an image.

Selected features may be conveniently described by a local descriptor (or "feature descriptor"), which typically provides a compact representation of the key visual characteristics of a feature in a manner that facilitates comparing and matching of features in an efficient way. For example, a feature descriptor may be a representation of the contrast in the pixels making up the feature. A local descriptor is formed through some transformation of the local image region around the feature point. Various algorithms exist for generating local descriptors from pixel data comprised in a feature. For example, local descriptors may be formed according to algorithms for generating SIFT (Scale Invariant Feature Transform) or SURF (Speeded-Up Robust Features) descriptors, or binary descriptors such as BRISK (Binary Robust Invariant Scalable Keypoint) or BRIEF (Binary Robust Elementary Features) descriptors. Local descriptors are often expressed as vectors (in "descriptor space") whose elements describe the variation in a visual characteristic of the represented feature.

Local descriptors facilitate efficient comparison of features in different images in order to assess whether those features may correspond to the same real-world point in the scene captured by the images. For example, a local descriptor for a feature from one image may be compared to the respective local descriptor for each of the features of a second image so as to form a descriptor distance for each feature pairing indicative of the similarity between the respective local descriptors and hence the features they represent. A comparison of two local descriptors may involve performing a vector subtraction in descriptor space of one local descriptor from the other, wherein a smaller descriptor distance (e.g. a smaller magnitude of the resulting vector in descriptor space) is indicative of a closer match between the features represented by the local descriptors.

The matching process can be error prone, even when using the best detection and local description methods.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a computer-implemented method of matching features identified in first and second images captured from respective camera viewpoints related by an epipolar geometry, each identified feature being described by a local descriptor, the method comprising:

using the epipolar geometry to define a geometrically-constrained region in the second image corresponding to a first feature in the first image represented by a first local descriptor;

comparing the first local descriptor with local descriptors of features in the second image, thereby determining respective measures of similarity between the first feature in the first image and the respective features in the second image;

identifying, from the features located in the geometrically-constrained region in the second image, (i) a geometric best match feature to the first feature, and (ii) a geometric next-best match feature to the first feature;

identifying, from any of the features in the second image, a global best match feature to the first feature;

performing a first comparison of the measures of similarity determined for the geometric best match feature and for the global best match feature, with respect to a first threshold;

performing a second comparison of the measures of similarity determined for the geometric best match feature and for the geometric next-best match feature, with respect to a second threshold; and in dependence on whether the first and second thresholds are satisfied, selecting the geometric best match feature in the second image as an output match to the first feature in the first image.

The selecting may comprise not providing an output match if either the first or second threshold is not satisfied.

The first threshold may be satisfied when, according to their respective similarity measures, the geometric best match feature is not worse than the global best match feature as a match to the first feature by an amount defined by a first predefined factor.

The second threshold may be satisfied when, according to their respective similarity measures, the geometric best match feature is better than the geometric next-best match feature as a match to the first feature by an amount defined by a second predefined factor.

Performing the first and second comparisons may comprise calculating first and second ratios of the magnitudes of the respective measures of similarity, the first and second thresholds being satisfied if the respective ratios satisfy the first and second thresholds, respectively.

Comparing the first local descriptor with local descriptors of features in the second image may comprise forming descriptor distances between the first local descriptor and the respective local descriptor for each of said features in the second image, and the identifying geometric best match and next-best match features may comprise identifying the shortest and next-shortest descriptor distances corresponding to features in the geometrically-constrained region in the second image.

The identifying the global best match feature may comprise identifying the shortest descriptor distance between the first local descriptor and the local descriptors of features in the second image not limited to those features lying in the geometrically-constrained region.

Each measure of similarity determined may be a descriptor distance between the first local descriptor and the local descriptor of the respective feature of the second image.

Each local descriptor may be a vector representing characteristics of pixels of the respective feature and determining each descriptor distance may comprisee performing a vector subtraction between the respective local descriptors and determining the magnitude of the resulting vector.

Each feature may be represented by a point and the local descriptor of each feature may be formed in dependence on pixels local to the point in the respective image.

Using the epipolar geometry to define a geometrically-constrained region in the second image may comprise using the epipolar geometry to derive an epipolar line or area in the second image corresponding to the first feature in the first image, wherein the epipolar line or area is used to define the geometrically-constrained region.

The geometrically-constrained region may comprise all pixels of the second image within a predefined distance of the epipolar line or area.

The predefined distance may be determined in dependence on one or more measures of error in the epipolar geometry.

The predefined distance may be a predefined perpendicular distance to the epipolar line or boundary of the epipolar area which varies with position in the respective image in dependence on the epipolar geometry.

The geometrically-constrained region may be the epipolar line or area.

Each feature may represent a localised set of pixels in the respective image and a feature may be determined to be located in the geometrically-constrained region using one of more of the following determinations: determining whether any pixel represented by the feature lies in the geometrically-constrained region; determining whether one or more predetermined pixels represented by the feature lie in the geometrically-constrained region; determining whether a predetermined proportion of pixels represented by the feature lie in the geometrically-constrained region.

The method may further comprise:
receiving camera data identifying limits on the viewable range from one or both of the camera viewpoints; and
processing the camera data so as to identify bounds on the geometrically-constrained region in the second image in accordance with the epipolar geometry.

The camera data may comprise for one or both camera viewpoints: depth information indicating nearest and/or furthest regions viewable from the camera viewpoint; field of view information indicating regions viewable from the camera viewpoint; a view frustum for the camera viewpoint; and data indicating regions in front of and/or behind the camera viewpoint.

The epipolar geometry may be used to derive an epipolar line and the method may further comprise transforming the coordinate system of the second image so as to map the epipolar line parallel to one of the coordinate axes and, subsequently in the transformed coordinate system, identifying the features located in the geometrically-constrained region in the second image.

The method may further comprise:
using the epipolar geometry to define a second geometrically-constrained region in the first image corresponding to the geometric best match feature in the second image;
comparing the local descriptor of the geometric best match feature with local descriptors of features in the first image, thereby determining respective measures of similarity between the first feature in the first image and the respective features in the second image;
identifying, from the features located in the second geometrically-constrained region in the first image, (i) a second geometric best match feature to the geometric best match feature of the second image, and (ii) a second geometric next-best match feature to the geometric best match feature of the second image;
identifying, from any of the features in the first image, a second global best match feature to the geometric best match feature of the second image;
performing a first comparison of the measures of similarity determined for the second geometric best match feature and for the second global best match feature, with respect to the first threshold;
performing a second comparison of the measures of similarity determined for the second geometric best match feature and for the second geometric next-best match feature, with respect to the second threshold; and
in dependence on whether the first and second thresholds are satisfied, confirming the geometric best match feature in the second image as the output match to the first feature in the first image.

Different cameras may capture the images from the respective camera viewpoints.

The same camera at different camera positions may capture the images from the respective camera viewpoints.

There is provided a data processing system for matching features identified in first and second images captured from respective camera viewpoints related by an epipolar geometry, each identified feature being described by a local descriptor, the data processing system comprising:
a geometry unit configured to use the epipolar geometry to define a geometrically-constrained region in the second image corresponding to a first feature in the first image represented by a first local descriptor;
a comparison unit configured to compare the first local descriptor with local descriptors of features in the second image thereby determining respective measures of similarity between the first feature in the first image and the respective features in the second image; and
a match unit configured to:
identify, from the features located in the geometrically-constrained region in the second image, (i) a geometric best match feature to the first feature, and (ii) a geometric next-best match feature to the first feature;
identify, from any of the features in the second image, a global best match feature to the first feature;
perform a first comparison of the measures of similarity determined for the geometric best match feature and for the global best match feature, with respect to a first threshold;
perform a second comparison of the measures of similarity determined for the geometric best match feature and for the geometric next-best match feature, with respect to a second threshold; and
in dependence on whether the first and second thresholds are satisfied, select the geometric best-match feature in the second image as an output match to the first feature in the first image.

The match unit may be configured to not provide an output match if either the first or second threshold is not satisfied.

The match unit may be configured to perform the first and second comparisons by calculating first and second ratios of the magnitudes of the respective measures of similarity, the first and second thresholds being satisfied if the respective ratios satisfy the first and second thresholds, respectively.

The comparison unit may be configured to form descriptor distances between the first local descriptor and the respective local descriptor for each of said features in the second image, and the match unit may be configured to identify geometric best match and next-best match features by identifying the shortest and next-shortest descriptor distances corresponding to features in the geometrically-constrained region in the second image.

The match unit may be configured to identify the global best match feature by identifying the shortest descriptor distance between the first local descriptor and the local descriptors of features in the second image not limited to those features lying in the geometrically-constrained region.

The geometry unit may be configured to use the epipolar geometry to derive an epipolar line or area in the second image corresponding to the first feature in the first image, wherein the epipolar line or area is used to define the geometrically-constrained region.

The geometrically-constrained region may comprise all pixels of the second image within a predefined distance of the epipolar line or area.

The predefined distance may be determined in dependence on one or more measures of error in the epipolar geometry.

The predefined distance may be a predefined perpendicular distance to the epipolar line or boundary of the epipolar area which varies with position in the respective image in dependence on the epipolar geometry.

Each feature may represent a localised set of pixels in the respective image and a feature may be determined to be located in the geometrically-constrained region if one of more of the following is true: any pixel represented by the feature lies in the geometrically-constrained region; one or more predetermined pixels represented by the feature lie in the geometrically-constrained region; a predetermined proportion of pixels represented by the feature lie in the geometrically-constrained region.

The geometry unit may be further configured to receive camera data identifying limits on the viewable range from one or both of the camera viewpoints and process the camera data so as to identify bounds on the geometrically-constrained region in the second image in accordance with the epipolar geometry.

The camera data may comprise for one or both camera viewpoints: depth information indicating nearest and/or furthest regions viewable from the camera viewpoint; field of view information indicating regions viewable from the camera viewpoint; a view frustum for the camera viewpoint; and data indicating regions in front of and/or behind the camera viewpoint.

The geometry unit may be configured to use the epipolar geometry to derive an epipolar line and may be further configured to transform the coordinate system of the second image so as to map the epipolar line parallel to one of the coordinate axes and cause the comparison unit to, in the transformed coordinate system, identify the features located in the geometrically-constrained region in the second image.

The data processing system may be further configured to:
at the geometry unit, use the known epipolar geometry to define a second geometrically-constrained region in the first image corresponding to the geometric best match feature in the second image;
at the comparison unit, compare the local descriptor of the geometric best match feature with local descriptors of features in the first image, thereby determining respective measures of similarity between the first feature in the first image and the respective features in the second image; and
at the match unit:
identify, from the features located in the second geometrically-constrained region in the first image, (i) a second geometric best match feature to the geometric best match feature of the second image, and (ii) a second geometric next-best match feature to the geometric best match feature of the second image;
identify, from any of the features in the first image, a second global best match feature to the geometric best match feature of the second image;
perform a first comparison of the measures of similarity determined for the second geometric best match feature and for the second global best match feature, with respect to the first threshold;
perform a second comparison of the measures of similarity determined for the second geometric best match feature and for the second geometric next-best match feature, with respect to the second threshold; and
in dependence on whether the first and second thresholds are satisfied, confirming the geometric best match feature in the second image as the output match to the first feature in the first image.

Different cameras may capture the images from the respective camera viewpoints.

The same camera at different camera positions may capture the images from the respective camera viewpoints.

The data processing system is embodied in hardware on an integrated circuit.

A data processing system may be configured to perform any of the method described herein.

There is provided a method of manufacturing, using an integrated circuit manufacturing system, a data processing system as described herein.

There is provided a method of manufacturing, using an integrated circuit manufacturing system, a data processing system as described herein, the method comprising:
processing, using a layout processing system, a computer readable description of the graphics processing system so as to generate a circuit layout description of an integrated circuit embodying the data processing system; and
manufacturing, using an integrated circuit generation system, the data processing system according to the circuit layout description.

There is provided computer program code for performing a method as described herein.

There is provided a non-transitory computer readable storage medium having stored thereon computer readable instructions that, when executed at a computer system, cause the computer system to perform a method as described herein.

There is provided an integrated circuit definition dataset that, when processed in an integrated circuit manufacturing system, configures the integrated circuit manufacturing system to manufacture a data processing system as described herein.

There is provided a non-transitory computer readable storage medium having stored thereon a computer readable description of a data processing system as described herein that, when processed in an integrated circuit manufacturing system, causes the integrated circuit manufacturing system to manufacture an integrated circuit embodying the data processing system.

There is provided a computer readable storage medium having stored thereon a computer readable description of a data processing system as described herein which, when processed in an integrated circuit manufacturing system, causes the integrated circuit manufacturing system to:
  process, using a layout processing system, the computer readable description of the data processing system so as to generate a circuit layout description of an integrated circuit embodying the data processing system; and
  manufacture, using an integrated circuit generation system, the data processing system according to the circuit layout description.

There is provided an integrated circuit manufacturing system configured to manufacture a data processing system as described herein.

There is provided an integrated circuit manufacturing system comprising:
  a non-transitory computer readable storage medium having stored thereon a computer readable description of a data processing system as described herein;
  a layout processing system configured to process the computer readable description so as to generate a circuit layout description of an integrated circuit embodying the data processing system; and
  an integrated circuit generation system configured to manufacture the data processing system according to the circuit layout description.

BRIEF DESCRIPTION OF THE DRAWINGS

The present invention is described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Often in image processing systems the relative position and orientation of the camera(s) when each image is captured is at least approximately known. For example, the relative position of a stereoscopic pair of cameras is known, although can be subject to variations—e.g. stereoscopic cameras mounted on a vehicle might move slightly relative to one another due to flex in the vehicle chassis and camera mount points. In a second example, information from an accelerometer in a smartphone may be used to determine the change in position and orientation of the smartphone between capturing images and hence provide an estimate of the relative position and orientation of the smartphone camera when each image is captured. Objects may also move in a scene between images captured at different times.

The relative position and orientation of the camera(s) when a pair of images is captured defines the epipolar geometry of the cameras (or in the case of a single camera, the camera locations when each image was captured). The epipolar geometry of a pair of cameras may be derived from, for example, a determination of the (possibly approximate or estimated) positions and orientations of the cameras, by estimating the epipolar geometry from the images captured by the cameras, or in any other manner. The epipolar geometry of a pair of cameras may be determined, approximated, or estimated in any manner. Unless otherwise stated, references herein to a "camera" will be understood to refer to a viewpoint from which an image is captured, synthesised or otherwise generated. As is typical in the art, the use of the term "camera" does not imply that an image is captured by a physical camera and references to different cameras are references to different viewpoints and not necessarily (although could be) different physical cameras.

There is provided an improved method for matching features identified in images which uses knowledge of the epipolar geometry to constrain the matching process. The method provides an increased number of correct matches and decreased number of incorrect matches compared to conventional methods which do not use the epipolar geometry to constrain the matching process.

Figure 1A:
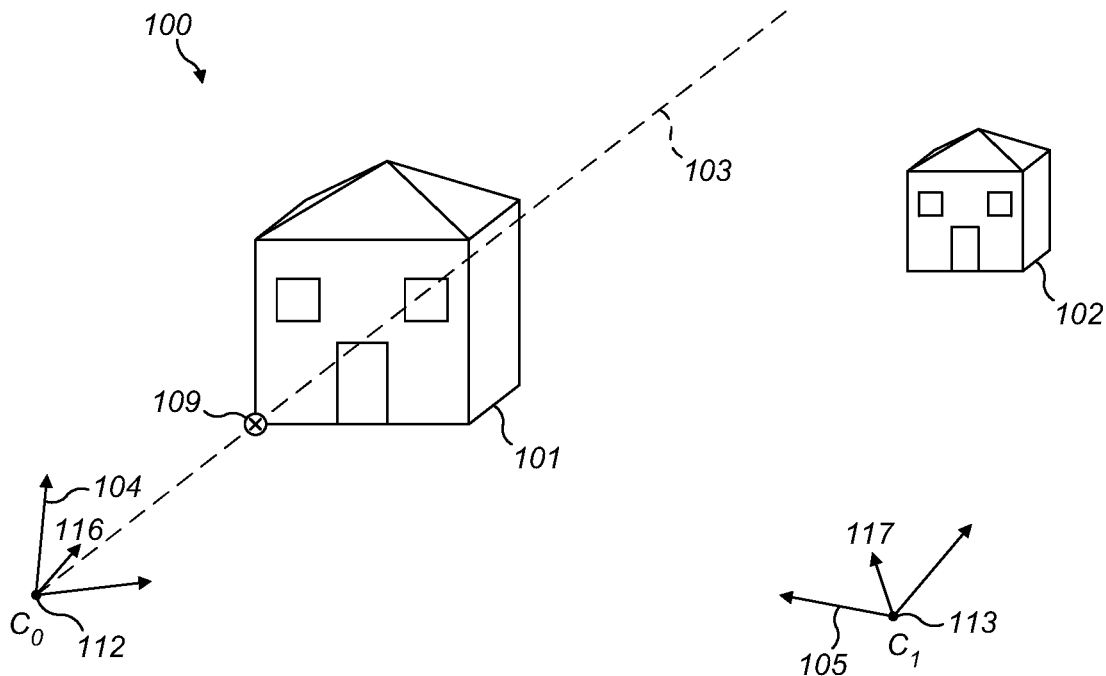
—FIG. 1(a) shows the scene, FIG. 1(b) an image captured at a first camera position.
Figure 1B:
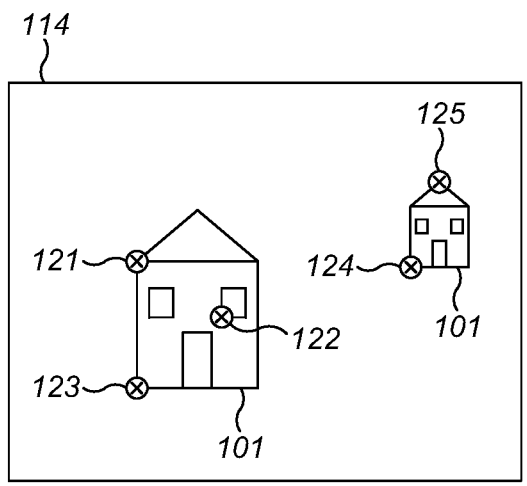
FIG. 1 illustrates a scene and its capture by a pair of cameras
FIG. 1(c) shows the image captured at a second camera position.
Figure 1C:
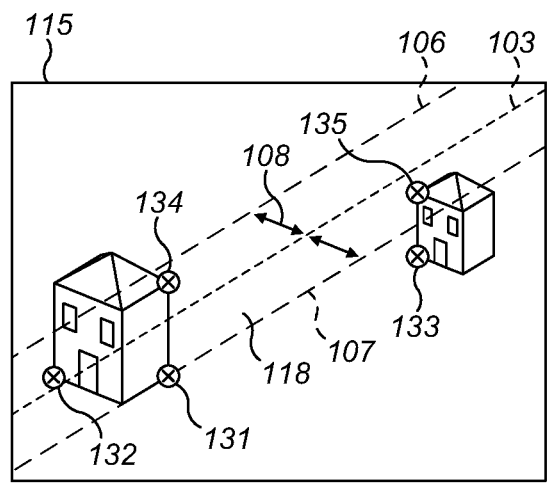

FIG. 1 illustrates a real-world scene 100 and its capture by cameras 112 and 113 at the locations marked C0 and C1. The scene and position of the cameras is shown in FIG. 1(a), the image 114 captured by camera 112 is shown in FIG. 1(b), and the image 115 captured by camera 113 is shown in FIG. 1(c). The cameras 112 and 113 could be different cameras, or one and the same camera at different time instants. The direction of view of each camera is indicated by arrows 116, 117 and the field of view of each camera is indicated by the respective pairs of arrows 104 and 105. Objects 101 and 102 are present in the scene 100 and observed from different views by cameras 112 and 113.

Consider a feature 109 on object 101. Feature 109 corresponds to an area of the image including the bottom left corner of the house 101, and may be chosen as a feature to track because it has a relatively high contrast. To camera 112, feature 109 is detected in the image as feature 123 shown in FIG. 1(b). In the present example, feature 109 may be represented by a point in image 114—e.g. it is a point, patch, corner or area feature. More generally the features identified in an image may be any kind of feature, including point, patch, area, edge, corner or line features, to give a few examples. Based on the knowledge available from image 114 and in the absence of depth information, a point representing feature 109 in image 114 may in the real-world scene lie anywhere along line 103 originating at camera 112 and extending out to the limit of vision of the camera. From the point of view of camera 113, that line 103 appears as an epipolar line extending across the field of view of the camera 113 as shown in FIG. 1(c).

Thus, features in image 114 which may be identified by a point in the image may be projected into image 115 as an epipolar line. Other types of features in image 114 may be mapped by the epipolar geometry as planes or volumes that are projected into image 115 as epipolar areas. For example, edge or line features in image 114 may be mapped by the epipolar geometry into planes which are projected into image 115 as epipolar areas of the image. An epipolar area may be used as the geometrically-constrained region 118 described below.

The epipolar geometry connecting the cameras is at least approximately known and therefore the position of the epipolar line 103 in image 115 may be calculated (at least to an approximation). As is known in the art, the epipolar geometry may be determined from the known positions of the cameras C0 and C1 (or the relative positions of those points) and the known orientation (or relative orientation) of the directions of view of the cameras (indicated by the arrows 116 and 117).

The epipolar geometry may be determined in any suitable manner. For example:
the relative positions and orientations of the pair of cameras may be known (e.g. due to being supported at a common device such as a vehicle or smartphone—possibly forming a stereoscopic pair of cameras);
the relative positions and orientations of the pair of cameras may be inferred through processing captured images (e.g. using a motion estimation technique) so as to yield three-dimensional information about the scene and hence permit an estimate as to the relative positions and orientations of the cameras (for example, by detecting corresponding sets of features in a pair of images and calculating the geometrical transformation required to transform the positions of the set of features in an image captured by the first camera into the positions of the set of features observed in an image captured by the second camera—the relative positions and orientations of the cameras may be inferred from the calculated geometrical transformation);
information from an accelerometer in a device in which the camera is implemented may be used to determine a change in position and orientation of the camera between two time instances at which the images are captured by the camera;
one or more of the above—for example, the position and orientation of the cameras may be roughly known facilitating the processing of captured images so as to yield three-dimensional information about the scene and hence permit an improved estimate as to the relative positions and orientations of the cameras (this process could be iterative over two or more captured images so as to systematically improve the estimate of the relative positions and orientations of the cameras).

However the epipolar geometry is determined, it may be used in the manner described herein to improve the matching of features identified in a pair of camera images.

Figure 2:
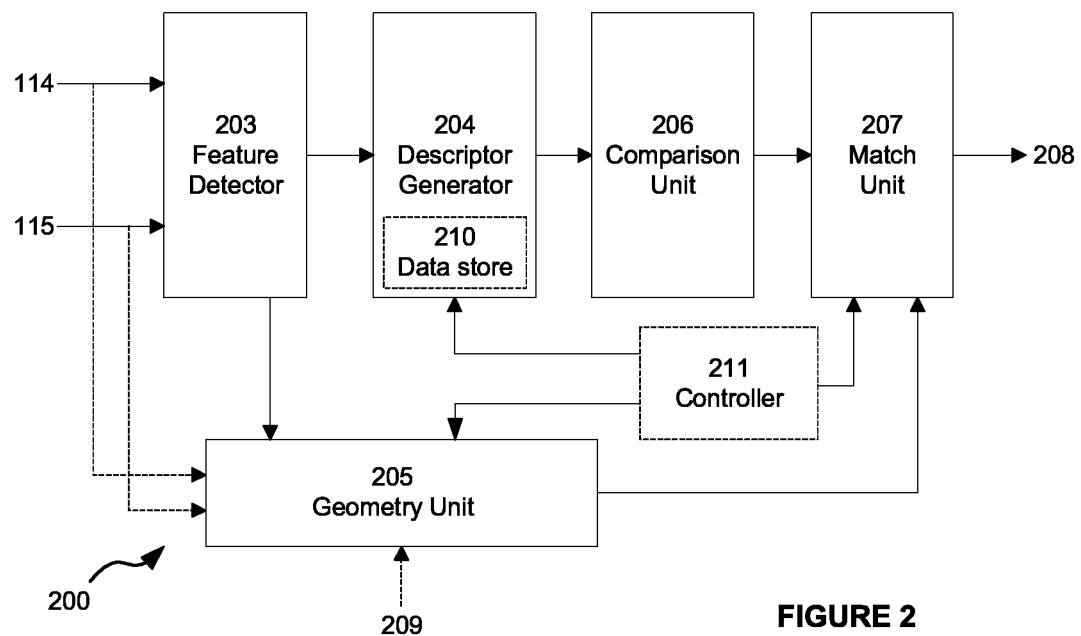
FIG. 2 is a schematic diagram of a data processing system for matching features in images captured at a pair of camera viewpoints related by an epipolar geometry.

FIG. 2 shows a schematic diagram of a data processing system 200 for matching features identified in the pair of images 114 and 115. A feature detector 203 is configured to detect features of interest in the images 114, 115. Feature detector 203 may be configured to detect any kind of feature, including point, patch, area, edge, corner or line features, to give a few examples. The feature detection could be performed in any manner, as appropriate to the particular application. Typically feature detectors look to detect high contrast features in an image which are well localised and may be consistently identified in images of a scene captured from different viewpoints. For example, the feature detector 203 may use feature detection algorithms which perform edge and/or corner detection in the pixel data of an image. Exemplary algorithms for performing feature detection for points, patches, corners, edges and lines are described in Chapter 4 of Computer Vision: Algorithms and Applications, R. Szeliski, Springer 2011.

In the example illustrated in FIG. 1, the feature detector operates a corner detection algorithm on images 114 and 115. The feature detector identifies corner features 121-125 in image 114 and corner features 131-135 in image 115. It is trivial for a human to observe that feature 123 in image 114 and feature 132 in image 115 correspond to one another and to feature 109 on object 101 in the real-world scene depicted in FIG. 1(a), but this is not trivial for a computer, and it is not at this point known to the system 200 which features in image 114 correspond to which features in image 115.

As described above, a descriptor generator 204 is configured to generate a local descriptor (or "feature descriptor") for each of the features identified in each image. Any kind of local descriptor may be generated, as appropriate to the particular application. A local descriptor generally provides a compact representation of visual characteristics of a feature in a manner that facilitates comparing and matching of features in an efficient way. For example, a local descriptor may be a representation of the contrast in the pixels of the image making up the feature. A local descriptor may be formed through some transformation of the local image region around the feature point. Various algorithms exist for generating local descriptors from pixel data comprised in a feature. For example, as described above, known local descriptors include SIFT, SURF, BRISK and BRIEF descriptors. Local descriptors are often expressed as vectors (in descriptor space) whose elements describe the variation in one or more visual characteristics of the represented feature.

The descriptor generator 204 may be configured to store the local descriptors it generates for each feature of an image at a data store 210. This can avoid the descriptor generator having to regenerate the local descriptor multiple times for the same feature. The data store may be any kind of memory (including a cache or lookup table) accessible to the descriptor generator. The descriptor generator 204 may comprise the data store 210 as shown in FIG. 2. The descriptor generator may store the local descriptors generated for an image whilst that image is being processed at the data processing system 200. Once an image is no longer required for feature matching, the data store may be flushed and the local descriptors generated for a next image stored at the data store.

The local descriptors generated for each feature are used in the comparison of the features detected in the images so as to identify those features in each image which correspond to the same real-world feature. The comparison of the local descriptors of features in image 114 with the local descriptors of features in image 115 is performed by comparison unit 206. The comparison performed by the comparison unit on the local descriptors of features in a pair of images may be performed in any manner so as to provide a measure of similarity between features.

The comparison unit may compare a local descriptor of a feature in image 114 with a local descriptor of each feature in image 115. The particular local descriptors which are compared and the order in which local descriptors are compared are implementation details and may in general be determined in any suitable manner at the comparison unit 206 so as to provide the similarity measures according to the feature matching algorithms described herein.

A comparison of local descriptors may be performed so as to form a descriptor distance. A descriptor distance represents a measure of similarity between the features corresponding to the local descriptors. A descriptor distance may be formed in any manner so as to be representative of the similarity between the features described by the local descriptors. For example, in comparing a pair of local descriptors, a descriptor distance may be formed by subtracting one of the local descriptors of the pair from the other of the pair and calculating the magnitude of that difference. Typically local descriptors are expressed as vectors such that the vector subtraction of local descriptors results in a vector whose magnitude in descriptor space expresses the difference between those local descriptors, and hence provides a measure of their similarity.

For a given feature in one image of an input pair of images, geometry unit 205 is configured to determine, based on at least approximate epipolar geometry for the one or more cameras which capture the input images, a geometrically-constrained region in the other image of the input pair. The geometry unit may itself estimate the epipolar geometry from received data 209, or the epipolar geometry may be at least approximately known to or received by the geometry unit. For example, for a pair of stereoscopic cameras, the epipolar geometry may be substantially fixed and stored at the geometry unit 205.

In some embodiments, the geometry unit 205 may be configured to receive data 209 identifying an estimate of the relative positions and orientations of the camera(s) capturing the input image. For example, in a smartphone an accelerometer may determine the approximate relative positions and orientations of a camera at the smartphone at the time instances that the two input images were captured, and the geometry unit may be configured to calculate the epipolar geometry from that data.

In some embodiments, the geometry unit 205 may be configured to receive the input images themselves and/or features identified in those images by the feature detector 203. The geometry unit may be configured to estimate the epipolar geometry of the camera(s) at the time(s) the input images were captured by processing the input images and/or features—e.g. by identifying a transform which maps the features of one input image onto the features of the other. Various algorithms are known in the art for calculating such transforms and inferring an estimate of the epipolar geometry from them.

The geometry unit 205 may receive features detected by the feature detector 203. Using the epipolar geometry established for a pair of images, the geometry unit is configured to generate a geometrically-constrained region in a second image of the input pair in which a match for a feature of a first image of the input pair is sought. A geometrically-constrained region represents an area of the second image within which, based on the epipolar geometry, a match is expected to lie. A geometrically-constrained region may be derived from an epipolar line or area for a feature for which a match is sought. As has been described, a point representing a feature in an image captured by one camera projects to an epipolar line in an image captured by the second camera. A line representing a feature in an image captured by one camera projects to an epipolar area in an image captured by a second camera.

The geometry unit may use its at least approximate knowledge of the epipolar geometry to derive an epipolar line or area in a second image for a given feature in a first image and form a geometrically-constrained region for that epipolar line or area. The geometry unit may identify the geometrically-constrained region for an image as being a region defined by those parts of the image which lie within a predefined distance of an epipolar line or area representing a subject feature in an image. The predefined distance may be fixed or may vary along the length of the epipolar line or with position in the epipolar area. Defining a geometrically-constrained region about an epipolar line or area accommodates uncertainty as to the exact epipolar geometry (e.g. the epipolar geometry may be an estimate). In some examples the geometrically-constrained region may be one and the same as the epipolar line or area.

In some examples, an image may be divided into a plurality of tiles and the geometrically-constrained region for a feature being sought may comprise the set of tiles through which an epipolar line or area determined for that feature passes, or the set of tiles having one or more points lying within a predefined distance of the epipolar line or within the epipolar area or a predefined distance of it.

A predefined distance to an epipolar line or area may be determined in dependence on one or more measures of the uncertainty in the epipolar geometry. For example, an estimate of the uncertainty in the epipolar geometry may be used to derive an estimate of the error in the epipolar geometry according to established principles of error analysis. Measures of the uncertainty in the epipolar geometry may be due to, for example, one or more of errors in the calculation of the epipolar geometry from received data, errors in the measurement of values from which the epipolar geometry is derived, and errors introduced by lens aberrations of the cameras. Since the error may vary across an image due to the effects of geometry and/or the size of the values representing an epipolar line or area (e.g. an error defined as a proportion of a value will vary in absolute size with the size of that value), the predefined distance from an epipolar line or area may also vary. For example, where a geometrically-constrained region is formed based on an epipolar line, the bounds of that region would not be parallel to the epipolar line, and may not be linear.

For instance, in the present example, at a point on the epipolar line 103 which is relatively close to the position of the camera $C_0$ 112, the perpendicular distance to the epipolar line (i.e. the distance of lines 106 and 107 from epipolar line 103 shown in FIG. 1c) may be relatively small compared to the corresponding perpendicular distance at a point on the epipolar line 103 which is relatively far from the position of the camera $C_0$ 112. In other examples, a single error estimate (e.g. an estimate of mean or maximum error) may be used such that the predefined distance is fixed across an image and the bounds of the geometrically-constrained region (e.g. 106 and 107) are parallel to the epipolar line.

More generally, a geometrically-constrained region may be determined in any manner—including empirically based on an assessment of the location of matching points in a pair of images for a given camera system. The bounds of the geometrically-constrained region may be defined by a predefined perpendicular distance from an epipolar line or area—which, for example, may be fixed or a function of position along an epipolar line or position in an epipolar area.

In the example shown in FIG. 1, feature 123 of image 114 is transformed by the geometry unit according to the epipolar geometry of cameras 112 and 113 into epipolar line 103 in image 115. A geometrically-constrained region 118 may be defined for the epipolar line 103 to include parts of the image within a determined perpendicular distance 108 of the line, including points on the epipolar line itself. In the example shown in FIG. 1(c), the perpendicular distance 108 thus defines bounds 106 and 107 on the region 118 within the image 115.

Once it has identified geometrically-constrained region 118 for image 115 which corresponds to feature 123 in image 114, the geometry unit may be configured to identify those features of image 115 which lie within that geometrically-constrained region. For example, given the set of all features in image 115, the geometry unit may be configured to identify a subset of features which lie within the geometrically-constrained region. In this manner, the geometry unit may be configured to identify those features in image 115 which, according to the epipolar geometry by which images 114 and 115 are related, may provide a match to feature 123 in image 114 for which the geometrically-constrained region 118 has been determined.

A match unit 207 is configured to identify matching features in a pair of images based on the measures of similarity formed at the comparison unit 206 and geometry data determined by geometry unit 205. The match unit receives measures of similarity between the local descriptors of features detected in a pair of images (e.g. 114 and 115) and geometry information identifying features which lie within each geometrically-constrained region determined for one or both of the images. The geometry information may be any kind of data that identifies to the match unit which of the features in an image lie within a geometrically-constrained region determined for that image. For example, the geometry information may be information identifying a set of features that geometry unit 205 has identified as being located within the geometrically-constrained region. In other examples, the geometry information may represent the geometrically-constrained region with the match unit itself being configured to determine which features of an image lie within that region.

A controller 211 may be provided for controlling the sequence of operations at the data processing system 200.

Returning to the example shown in FIG. 1, for a given feature 123 of image 114 for which a match is sought in a second image 115, the controller could be configured to cause:

a) the geometry unit to determine geometrically-constrained region 118 in image 115;

b) the descriptor generator to generate local descriptors for feature 123 of image 114 and each of the features identified in image 115 by the feature detector, and to store those local descriptors at data store 210;

c) using the local descriptors stored at data store 210, the comparison unit 206 to compare each of the features identified in image 115 to feature 123 of image 114;

d) the match unit 207 to receive the measures of similarity generated by the comparison unit along with geometry information identifying those features of image 115 which lie within geometrically-constrained region 118;

e) the match unit 207 to use the measure of similarity and geometry information to identify a best match feature in image 115 for feature 123 of image 114.

Many other implementations are possible and the above controller configuration is merely one possible approach to sequencing the operations of a data processing system configured to perform feature matching in accordance with the principles described herein.

In order to identify a matching feature, the match unit 207 is configured to identify (a) the best match for a feature of a first image in the geometrically-constrained region of a second image and (b) the best match for that feature of the first image globally (e.g. anywhere or substantially anywhere) in the second image. The match unit determines the best match for a feature from the set of similarity measures generated at the comparison unit 206 for the respective region of the image, the most similar feature being chosen as the best match. The next-best match is the next-most similar feature as indicated by the similarity measures. For the geometrically-constrained region, the set of similarity measures from which the best match is chosen is the set of similarity measures of features lying in the geometrically-constrained region in the second image 115. For the image as a whole, the set of similarity measures from which the best match is chosen is the set of similarity measures of features anywhere or substantially anywhere in the image (e.g. matches at the edges of the image may be ignored). If the similarity measure is a descriptor distance, the feature having the lowest descriptor distance (in descriptor space) is the most similar to the feature of the first image for which a match is sought.

The match unit is configured to compare the similarity measure (e.g. a descriptor distance $s_{N1}$) of the best match in the geometrically-constrained region to the similarity measure (e.g. a descriptor distance $s_G$) of the global best match in the second image. In order for the best match feature in the geometrically-constrained region to be selected as the output match 208, the similarity measure of the best match in the geometrically-constrained region must either be equal to the similarity measure of the global best match in the second image or not indicate a significantly worse match than the global best match. Any suitable comparison may be performed between the similarity measures in order to determine whether the best match feature in the geometrically-constrained region can be selected as an output match 208. For example, the comparison may comprise forming a ratio of the similarity measures, forming a ratio of the squares (or another power) of the similarity measures, subtracting one similarity measure from the other, etc.

The comparison of the similarity measure for the best geometrically-constrained feature (e.g. descriptor distance $s_{N1}$) and the similarity measure for the best global feature (e.g. descriptor distance $s_G$) may comprise forming a ratio $$\left(\text{e.g. } \frac{s_{N1}}{s_G}\right)$$

of those similarity measures. In examples described herein the similarity measures are descriptor distances in descriptor space, wherein a lower descriptor distance indicates a greater similarity. For example, the comparison may involve determining whether the ratio of the geometrically-constrained and global descriptor distances $$\left(\frac{s_{N1}}{s_G}\right)$$

is below a predefined threshold $t_G$, wherein $t_G$ is greater than unity. If this condition is satisfied then the best match feature in the geometrically-constrained region is not a significantly worse match than the global best match feature in the second image. As an example, the threshold, $t_G$, may be chosen to be in the range 1.01 to 1.1. An optimal value for the threshold $t_G$ for a given application and camera system may be empirically identified. This first ratio test ensures that the match found in the geometrically-constrained region is not significantly worse than the global best match in the image. If the global best match is in the geometrically-constrained region then the same feature will be the best match for the global image and for the geometrically-constrained region, such that $s_{N1}=s_G$, and the ratio $$\frac{s_{N1}}{s_G}=1.$$

The match unit may be further configured to perform a second test which compares the similarity measure of the best match in the geometrically-constrained region to the similarity measure of the next-best match in the geometrically-constrained region. The match unit may be further configured such that the best match feature in the geometrically-constrained region can be selected as the output match 208 if the similarity measures for the best match and the next-best match in the geometrically-constrained region indicate that the best match is a significantly better match than the second best match in that region. In the examples in which the similarity measures are descriptor distances, this second test comparison may involve determining whether the ratio of the best match descriptor distance ($s_{N1}$) and the next-best descriptor distance ($s_{N2}$) of the features in the geometrically-constrained region is below a predefined threshold ($t_N$) (which is less than unity), indicating that the best match feature in the geometrically-constrained region is a significantly better match than the next-best feature in geometrically-constrained region. The threshold $t_N$ must be in the range $0<t_N<1$, and typically a value is chosen for $t_N$ in the range $0.5 \leq t_N \leq 0.8$. This second ratio test ensures that the best match in the geometrically-constrained region is unambiguous.

In examples described herein, in order for the best match in the geometrically-constrained region to be selected as the output match 208 both conditions must be satisfied, i.e. $\frac{s_{N1}}{s_G}<t_G$, and $\frac{s_{N1}}{s_{N2}}<t_N$.

When either the first or the second ratio tests are not satisfied the match unit may be configured to not output a match for the given feature of the first image whose match is sought in the second image. In this manner, the match unit can be configured to provide only matches of high confidence. In other words, the match unit provides only matches which are unambiguously the best match in the geometrically-constrained region for a feature and for which there is not a significantly better match outside of the geometrically-constrained region.

On identifying a best match for a feature, the match unit may be configured to confirm that the match is symmetric. A best match is symmetric if the best match for a feature $f_A$ in a first image is feature $f_B$ in a second image and the best match for the feature $f_B$ in the second image is the feature $f_A$ in the first image. Thus, on identifying a best match $f_B$ in a second image for a feature $f_A$ of a first image, the match unit may be configured to subsequently identify the best match in the first image for feature $f_B$. If the feature $f_A$ is found to be the best match in the first image for $f_B$ then $f_B$ is confirmed as the best match in the second image for $f_A$ (it follows that $f_A$ may also be confirmed as the best match in the first image for $f_B$).

If a best match for a feature is not found to be symmetric and hence not confirmed, the match unit may be configured to not provide a best match output for that feature.

A mathematical example will now be described in which the similarity measures are descriptor distances such that a lower distance indicates a better match between features. It will be appreciated that the following approach can be readily modified for other types of similarity measure—for example where a larger value indicates a better match between features.

A local descriptor vector, d, is computed for each detected feature in an image such that each feature may be defined as a point with a descriptor, $f=\{o, d\}$ where o is the position of the feature in the image. Any method may be used for computing the descriptor vector for a feature. In this example a distance between descriptor vectors may be evaluated which returns a lower score when there is a better match between features.

Given two sets of features, $f_0=\{f_{00}, f_{01}, \ldots, f_{0i}, \ldots, f_{0(I-1)}\}$ in a first image and $f_1=\{f_{10}, f_{11}, \ldots, f_{1j}, \ldots, f_{1(J-1)}\}$ in a second image, descriptor-based matching involves finding nearest neighbour pairs of features in descriptor space. For example, the second set $f_1$ is searched for the best match feature to feature $f_{00}$ of the first set; then the second set is search for the best match feature to the next feature $f_{01}$ of the first set; and so on until matches have been sought for the complete set of features $f_0$. The two images are related by an epipolar geometry which is at least approximately known. This knowledge can be considered to provide "geometric constraints" on the matching process.

For a given feature of the first set, three descriptor distances may be identified: descriptor distance $s_{N1}$ between the given feature of the first set and its nearest neighbour (in descriptor space) in the second set that satisfies the geometric constraints (i.e. lies within a geometrically-constrained region determined in accordance with the principles described herein); descriptor distance $s_{N2}$ between the given feature of the first set and its next-nearest neighbour (in descriptor space) in the second set that satisfies the geometric constraints; and descriptor distance $s_G$ between the given feature of the first set and its global nearest neighbour in the second set irrespective of geometry (i.e. selected from any of the features of the second set). Two ratio tests are applied using these descriptor distances.

The first ratio test is between the nearest neighbour that satisfies the geometry constraints and the nearest neighbour irrespective of geometry (e.g. anywhere in the image):

$$s_{N1}s_G^{-1} < t_G.$$

As described above, $t_G$ is larger than one, and may be chosen to be in the range $1.01 \le t_G \le 1.1$.

The second ratio test is a nearest neighbour ratio test subject to the geometry constraints established by the epipolar geometry between the images in which the feature match is sought:

$$s_{N1}s_{N2}^{-1} < t_N.$$

Here, as described above, $t_N$ is in the range $0 < t_N < 1$, and may be chosen to be in the range, $0.5 \le t_N \le 0.8$.

The first ratio test compares the selected match against the features of the whole image to ensure that the match is not a significantly worse match than any other match in the image. This helps to ensure that the identified best match in the geometrically-constrained region is a genuine match for the subject feature in the other image. This first test may be referred to as the global nearest neighbour ratio test. The second ratio test checks that the match is unambiguously the best match within the geometrically-constrained region.

The use of epipolar geometry constraints in the second ratio test in particular helps to exclude many possible incorrect matches and improve the reliability of feature matching between images. This can be appreciated by returning to FIG. 1.

The feature detector 203 identifies features 121-125 in image 114 and features 131-135 in image 115. Consider the case when the data processing system 200 is arranged to identify a match for feature 123 in image 114. As described, the geometry unit 205 uses the at least approximately known epipolar geometry between the images to derive a geometrically-constrained region 118 in image 115 describing the expected range of positions of the feature 123. The geometry unit 205 may derive the geometrically-constrained region 118 from an epipolar line formed for image 115 in respect of a feature identified in image 114—for example, by identifying a region comprising those parts of the image 115 which lie within a predefined distance 108 of the epipolar line.

Each of the features 131-135 detected in image 115 has a local descriptor generated for it by descriptor generator 204. The comparison unit 206 is configured to compare each of the local descriptors of the features 131-135 with the local descriptor formed for the subject feature 123 of image 114. Using the local descriptors of the features, the match unit 207 identifies the best and next-best matches to feature 123 from the features 132, 134, 135 which lie in the geometrically-constrained region 118 identified by the geometry unit 205. In this case, the closest match is identified as being feature 132 and the next closest is feature 135. The match unit further identifies the best global match to feature 123 from all of features 131-135. In this case, the closest global match is also identified as being feature 132.

In this example, provided the thresholds of the ratio tests are satisfied, feature 132 will be selected as the best match for feature 123. It can be appreciated from FIG. 1 that this is the correct match.

In other examples, feature 133 might present as the best global match to feature 123 (perhaps due to partial occlusion of feature 132 in image 115 by another object in the scene). Feature 133 could not however be selected as a match for feature 123 because it does not lie in the geometrically-constrained region 118. If feature 133 is a significantly better match than feature 132 (i.e. if $$\frac{s_{132}}{s_{133}} \ge t_G,$$

where $d_{132}$ is the descriptor distance for feature 132 and where $d_{133}$ is the descriptor distance for feature 133) then feature 132 would not be selected as a match to feature 123 and no match would be returned for feature 123. Despite no match being provided this is generally advantageous compared to returning ambiguous or incorrect matches. Other feature matches may yet be found between the images: for example, feature 133 is likely to be identified as a match to feature 124.

Figure 3:
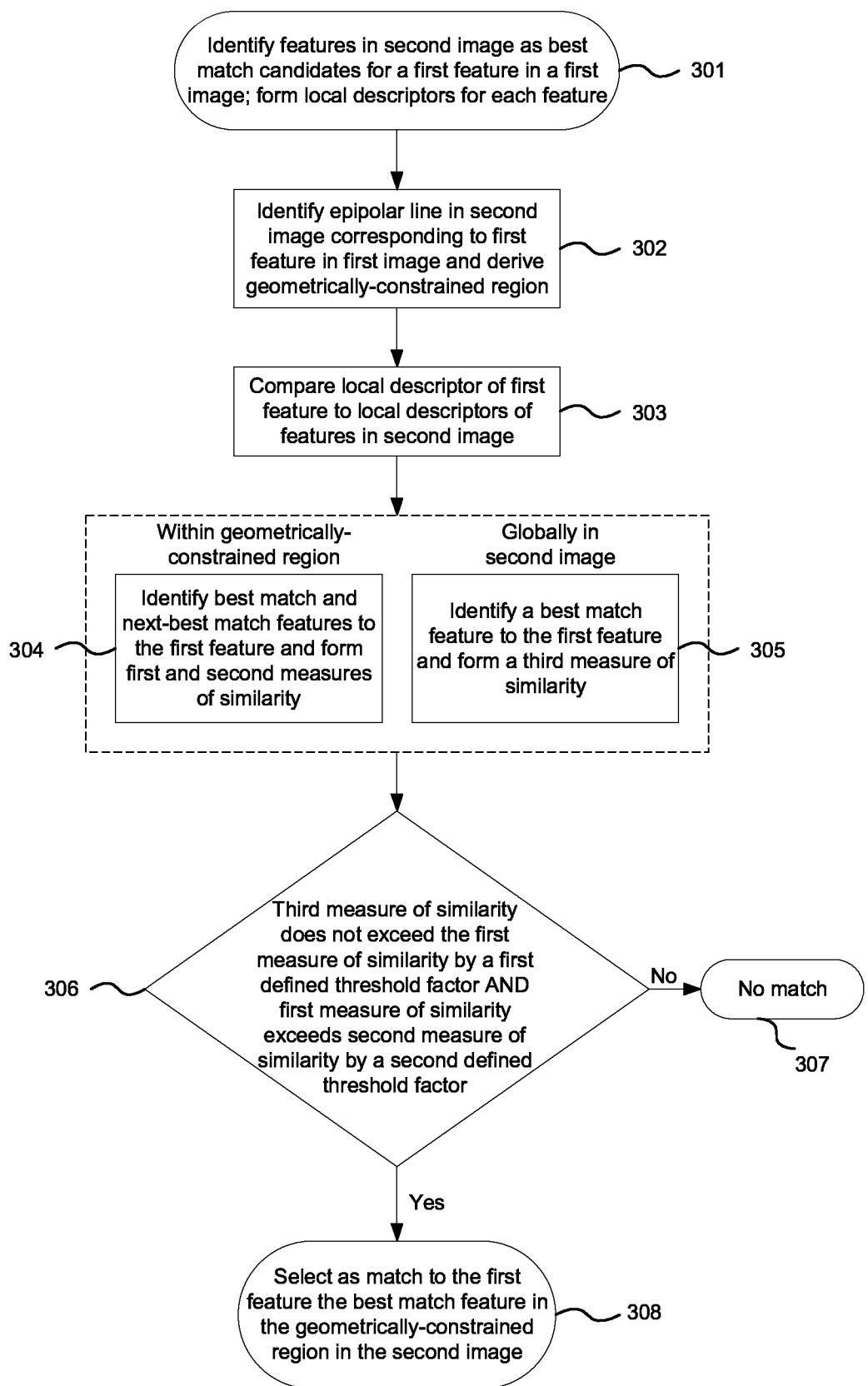
FIG. 3 shows a flowchart of a method for matching features in images captured at a pair of camera viewpoints related by an epipolar geometry.

FIG. 3 is a flowchart illustrating the method of identifying a match in a second image for a feature of a first image as performed by data processing system 200 in the present example. At step 301 features are identified in the second image and a local descriptor is formed for the first feature and each feature of the second image so as to facilitate comparison of the features. For the first feature in the first image of the input pair, the corresponding epipolar line in image 115 is determined at step 302 using the known epipolar geometry between the two images, and a geometrically-constrained region is derived from the epipolar line.

At step 303 the local descriptor of the first feature is compared to the local descriptors of the detected features in the second image. This comparison is performed so as to at 304 identify best match and next-best match features for the first feature in the geometrically-constrained region of the second image. And at 305 the global best match feature in the second image is identified. Measures of similarity (e.g. descriptor distances) are formed by the comparison for each of the global and geometrically-constrained best match and next-best match features. The ratio tests are then performed at 306 on the measures of similarity in order to verify that the best-match feature in the geometrically-constrained region is not a significantly worse match than the global best-match feature in the image by at least a first threshold factor, and that the best-match feature in the geometrically-constrained region is a significantly better match than the next-best match feature in that region by at least a second threshold factor. If the ratio tests are satisfied, the best-match feature in the geometrically-constrained region is selected 308 as the output match for the first feature. Otherwise, no match 307 is provided for the first feature.

In a system in which the epipolar geometry between cameras/camera positions is known as a result of being estimated from images captured at the cameras/camera positions, it can be advantageous to use the output matches to improve the estimates of the epipolar geometry. The improved estimate of the epipolar geometry can then be used in the methods described herein to identify future feature matches. In this manner, iterative improvement of the estimated epipolar geometry and of the feature matches can be achieved. For example, the geometry unit 205 of the data processing system shown in FIG. 2 may be configured to estimate the epipolar geometry from matching features identified in a pair of images of a scene captured from different camera positions—e.g. by using an appropriate algorithm for determining a coordinate transform which maps a set of detected features in one image onto a set of matching detected features in a second image of an image pair. As is known in the art, once the coordinate transformation required to map points between images is known, the fundamental matrix (or another set of values) describing the epipolar geometry of those images can be derived. Exemplary techniques for identifying a coordinate transformation to map between two images and hence deriving the epipolar geometry relating those images are described in Chapter 7 of Computer Vision: Algorithms and Applications, R. Szeliski, Springer 2011.

View Constraints

It is possible to further improve the definition of a geometrically-constrained region derived from an epipolar line in order to exclude areas of an image from a region where it is known that a match will not be found. One such improvement may be achieved by using knowledge of the view frustum of one or both cameras. For example, depth constraints can be determined for one or both cameras capturing images in which feature matching is to be performed. Depth constraints may comprise one or more of: data (e.g. one or more planes or other surfaces) defining the nearest and/or furthest points in the real-world scene relative to the camera which might be identified as features; data (e.g. one or more planes or other surfaces) defining the field of view of one or both cameras so as to identify the range of points viewable to a camera; data defining which points lie in front of or behind the camera (e.g. a geometric test for identifying whether a point in a scene lies behind a camera and therefore will not be visible to the camera). Note in some examples, the images in which feature matching is to be performed will be captured by the same camera.

Identifying view constraints for a pair of cameras (or the same camera at two different positions and/or orientations) can be approached mathematically as follows. In the example below, a point in a first image 1 is projected into a second image 0.

A fundamental matrix may be used to describe the epipolar geometry of a pair of cameras. The fundamental matrix can be used to project a point in one image to a line in the other image. A 3D point that projects to the point in the first image must lie on the line in the second image. As described above, this epipolar relationship can be used to constrain the matching of 2D features between views. Additional depth constraints may be identified based on the limited range of depths that a 3D point can assume relative to the cameras.

Assume a point in 3D space $x \in \mathbb{P}^3$ is observed in two images as points: $o_0, o_1 \in \mathbb{R}^2$. Let the homogeneous versions of the observations be $p_0=[o_0\ 1]^T, p_1=[o_1\ 1]^T$. The epipolar geometry is defined as, $$p_1^T F p_0 = p_0^T F^T p_1 = 0,$$

where F is the fundamental matrix.

In a matching problem, x may be unknown and the correspondence between $p_0$ and $p_1$ is unknown. The epipolar geometry can be used to constrain the search for a match. Given point $p_1$, a candidate point $p_0$ in image 0 can only be a match for $p_1$ if it lies on the line, $$l_0 = p_1^T F.$$

As described above, it is advantageous to make allowance for noise and error in the epipolar geometry defined by the fundamental matrix, so the test may be applied as, $$\text{dist}(l_0, p_0) < t,$$

where $\text{dist}(l_0, p_0)$ finds the shortest Euclidean distance between the point and the line (e.g. the perpendicular distance to the line), and t is a threshold chosen according to the allowable error.

Additional constraints can be applied if the depth of the point relative to camera 1 is known to be limited and the calibration of the cameras is known. The camera calibration may consist of an intrinsic parameter matrix K, an extrinsic rotation R, and a translation t.

$$K = \begin{bmatrix} f_x & s & c_x \\ 0 & f_y & c_y \\ 0 & 0 & 1 \end{bmatrix},$$

where $f_x$ and $f_y$ are the horizontal and vertical focal lengths, the centre of projection is the point $(c_x, c_y)$ in the image, and s is the skew parameter, which is 0 for square pixel cameras. The point projection equation is therefore, $$p = Px = K[R\ t]x.$$

The nearest and farthest possible solution for x can be found and projected to image 0 to find bounding points on the line $l_0$. First, the line in 3D that projects to $p_1$ must be found (also known as the back-projection of point $p_1$). It can be defined as the line between the camera centre $C_1$ and the point i on the plane at infinity that projects to point $p_1$. Where no further information about depth constraints are available, these two points also serve as the minimum and maximum depth solutions for x. The camera centre is, $$C_1 = \begin{bmatrix} -R_1^T t_1 \\ 1 \end{bmatrix}.$$

The point i has the form $i=[x_i\ y_i\ z_i\ 0]^T=[i'\ 0]$. It can be interpreted as a direction vector and can be solved from the projection equation, $$p_1 = K_1[R_1\ t_1]\begin{bmatrix} x_i \\ y_i \\ z_i \\ 0 \end{bmatrix}$$

$$\therefore i' = \begin{bmatrix} x_i \\ y_i \\ z_i \end{bmatrix} = R_1^T K_1^{-1} p_1.$$

Here $R_1^T = R_1^{-1}$ because R is orthogonal by definition (it is a rotation matrix) and $$K_1^{-1} = f_x^{-1} f_y^{-1} \begin{bmatrix} f_y & -s & -f_y c_x + s c_y \\ 0 & f_x & -f_x c_y \\ 0 & 0 & f_x f_y \end{bmatrix}.$$

The 3D point is then any point that satisfies and lies on the epipolar line, $$x = ai + bC_1.$$

The geometry unit 205 may be configured to calculate an epipolar line in the above manner based on a fundamental matrix expressing at least an approximation of the epipolar geometry.

Note that even though i is a homogeneous quantity, the scale of the vector should remain as computed above as i' to ensure solutions for a have the correct scale in later steps. Furthermore, the sign is important for determining whether i is in front of or behind camera 0. Since x is an inhomogeneous quantity (and its scale and sign is only important if x=i), the values of a and b may be scaled by any factor to yield an equivalent result. It is simplest to express any finite point by setting b=1 and to express the infinite point by setting b=0.

The depth of a finite point is found by transforming the point to camera coordinates and measuring the z-coordinate.

$$x_{d1} = \begin{bmatrix} R_1 & t_1 \\ 0^T & 1 \end{bmatrix} x,$$

$$= \begin{bmatrix} R_1 & t_1 \\ 0^T & 1 \end{bmatrix} \left( a \begin{bmatrix} i' \\ 0 \end{bmatrix} + \begin{bmatrix} -R_1^T t_1 \\ 1 \end{bmatrix} \right),$$

$$= a \begin{bmatrix} R_1 i' \\ 0 \end{bmatrix} + \begin{bmatrix} 0 \\ 1 \end{bmatrix},$$

$$= \begin{bmatrix} aR_1 i' \\ 1 \end{bmatrix},$$

$$= \begin{bmatrix} aK_1^{-1} p_1 \\ 1 \end{bmatrix},$$

$$= [x_{d1} \quad y_{d1} \quad z_{d1} \quad 1]^T.$$

$$z_{d1} = K_1^{-1(3)} p_1 = a,$$

where $K_1^{-1(3)} = [0 \; 0 \; 1]$ is the third row of $K_1^{-1}$. Hence, a solution for x with depth d is found by setting a=d, $$x(d) = di + C_1.$$

Let the minimum working depth of the camera be $d_n$ and the maximum depth be $d_f$, then the corresponding solutions for x in image 1 are $x_n = x(d_n)$ and $x_f = x(d_f)$. Where the working range of the camera is not known, the camera centre and infinite point provide an absolute maximum working range $(x_n(0) = C_1, x_f(\infty) = i)$. Projecting these bounding points to image 0 gives bounding points on the epipolar line in image 0, $$p_n = P_0 x_n,$$

$$p_f = P_0 x_f.$$

FIGS. 4 to 10 illustrate different situations based on the nature and position of the bounding points. In these figures, one dimension is discarded for simplicity so that the projection of 2D points to a 1D image is shown. $\pi_0$ is the image plane of camera 0, and the triangle containing $\pi_0$ and $C_0$ defines the angle of view of camera 0.

Figure 4:
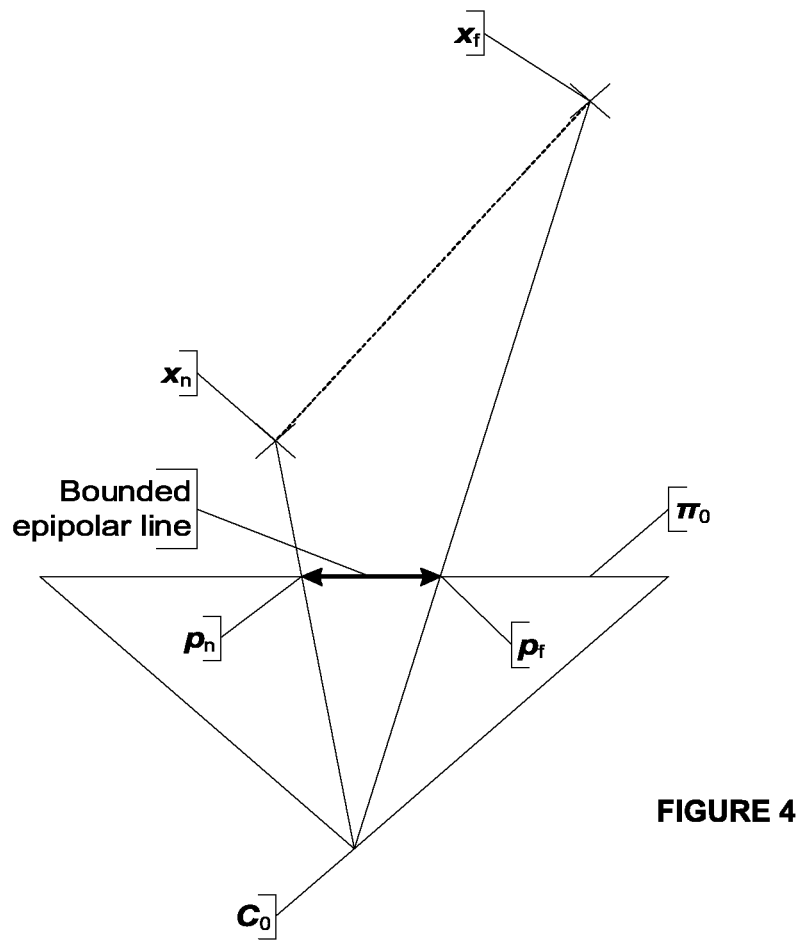
FIG. 4 is a schematic diagram of a bounded epipolar line formed in the image plane of a camera where both bounding points are finite and in front of the camera.
Figure 6:
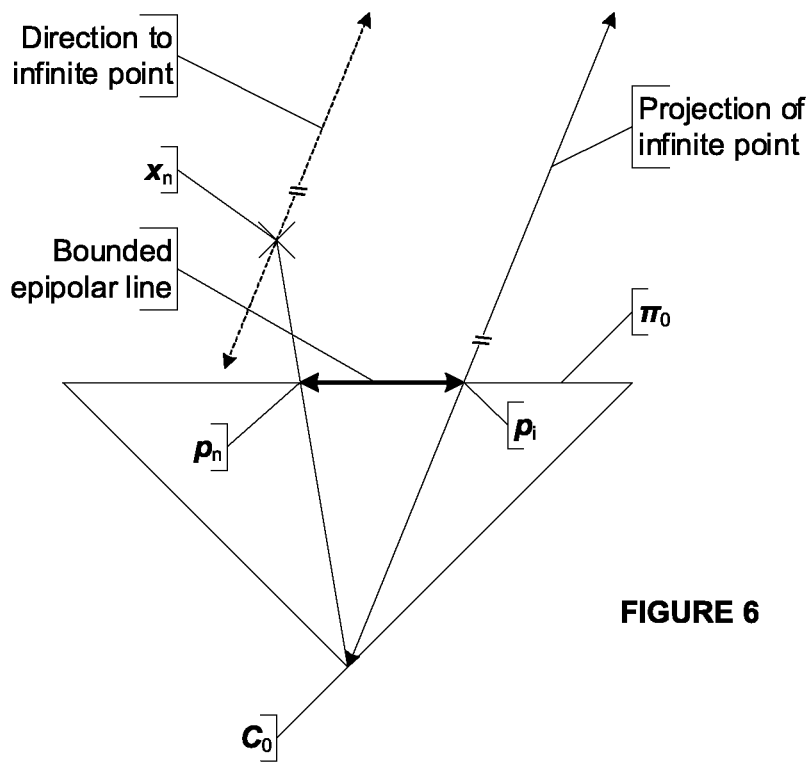
FIG. 6 is a schematic diagram of a bounded epipolar line formed in the image plane of a camera where one point is at infinity in front of the camera and the other is a finite point in front of the camera.

If both $x_n$ and $x_f$ are in front of camera 0, then the epipolar line is found in image 0 as the line joining $p_n$ and $p_f$, as illustrated in FIG. 4 for the finite case and in FIG. 6 for the case where $x_f = i$.

If both $x_n$ and $x_f$ are behind camera 0, then point x cannot be observed by camera 0 and the epipolar line is not defined. Where it is established that a feature can only be observed by one of the cameras, feature matching may not be performed and the processing cost associated with that matching avoided.

Figure 5:
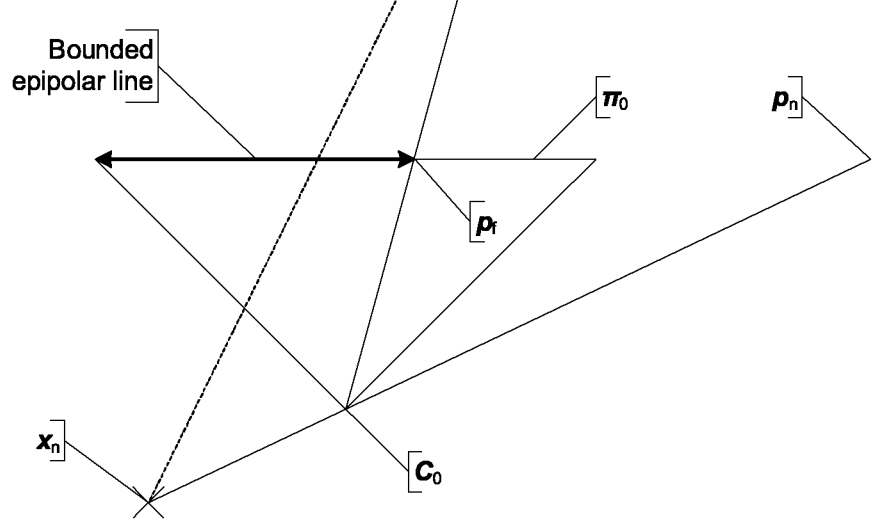
FIG. 5 is a schematic diagram of a bounded epipolar line formed in the image plane of a camera where one of the bounding points is behind the camera.
Figure 7:
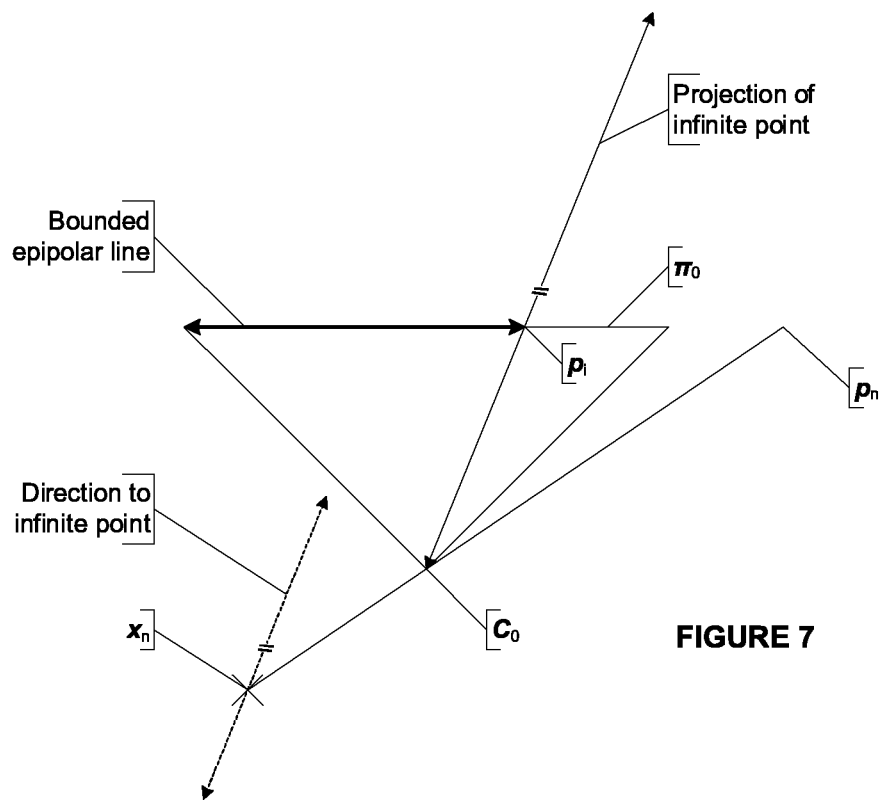
FIG. 7 is a schematic diagram of a bounded epipolar line formed in the image plane of a camera where one point is at infinity in front of the camera and the other is a finite point behind the camera.
Figure 8:
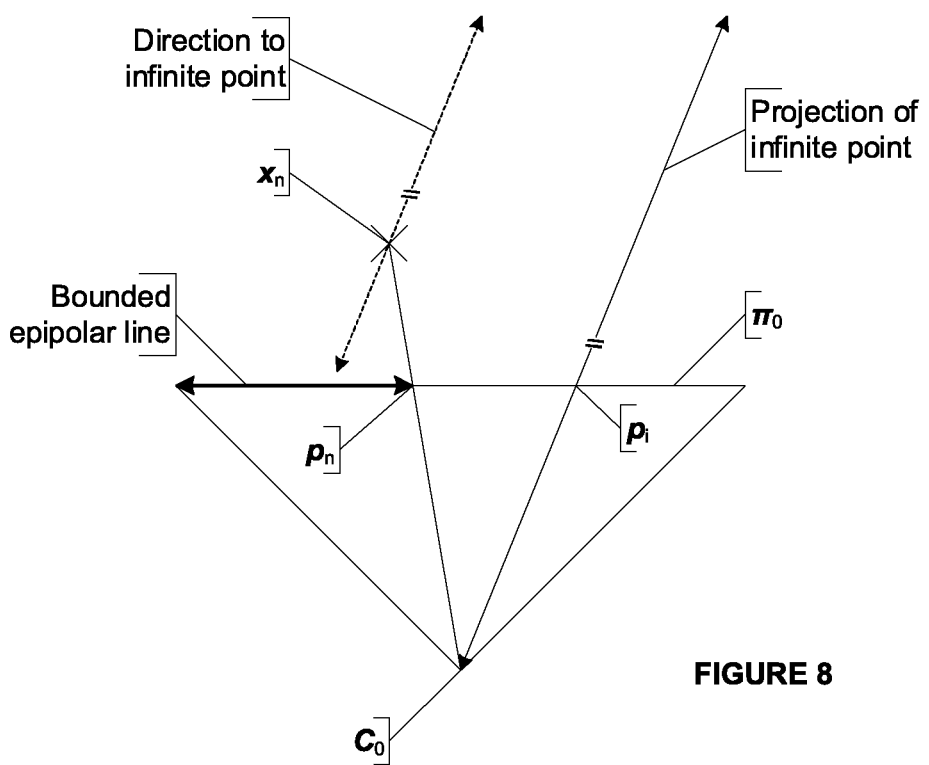
FIG. 8 is a schematic diagram of a bounded epipolar line formed in the image plane of a camera where one point is at infinity behind the camera and the other is a finite point behind the camera.

If one point is in front of the camera and the other behind, then the epipolar line extends from the image of the point in front of camera 0, in the direction away from the projection of the point behind camera 0. FIG. 5 illustrates this case for finite points. FIG. 7 shows the case where $x_n$ is behind the camera, and FIG. 8 shows the case where $x_f$ is infinite and behind the camera.

Incorporating the depth constraints relative to camera 0 further constrains the epipolar line. This also prevents the cases where one bounding point is in front of camera 0 and the other is behind. To find the depth of the point relative to camera 0, transform it to the camera 0 coordinate space, $$x_{d2} = \begin{bmatrix} R_0 & t_0 \\ 0^T & 1 \end{bmatrix} x,$$

$$= \begin{bmatrix} R_0 & t_0 \\ 0^T & 1 \end{bmatrix} \left( a \begin{bmatrix} i' \\ 0 \end{bmatrix} + \begin{bmatrix} -C_1 \\ 1 \end{bmatrix} \right),$$

$$= a \begin{bmatrix} R_0 i' \\ 0 \end{bmatrix} + \begin{bmatrix} t_0 - R_0 C_1 \\ 1 \end{bmatrix},$$

$$= \begin{bmatrix} aR_0 i' + t_0 - R_0 C_1 \\ 1 \end{bmatrix},$$

$$= \begin{bmatrix} aR_0 R_1^T K_1^{-1} p_1 + t_0 - R_0 C_1 \\ 1 \end{bmatrix},$$

$$= [x_{d0} \quad y_{d0} \quad z_{d0} \quad 1]^T.$$

The depth is then $z_{d0}$, $$d_0 = z_{d0} = a(R_0 R_1^T K_1^{-1})^{(3)} p_1 + t_{z0} - R_0^{(3)} C_1 = a\alpha + \beta,$$

Where the superscript $^{(3)}$ indicates row 3 of a matrix. Inverting the equation gives an expression for a, given a depth value relative to camera 0.

$$a = \alpha^{-1}(d_0 - \beta).$$

Note that if the back-projection of $p_1$ is parallel to the image plane of camera 0, then $\alpha = 0$ and the above equation is not valid. The depth limits $d_n$ and $d_f$ can be converted from depths relative to camera 0, to depths relative to camera 1 according to, $$d_{n0} = \alpha^{-1}(d_n - \beta),$$

$$d_{f0} = \alpha^{-1}(d_f - \beta).$$

Depending on the relative orientation of the cameras, $d_{n0}$ may be at a greater depth relative to camera 1 than $d_{f0}$. To simplify comparing depths, if $d_{n0} > d_{f0}$, the depths can be swapped so that $d_{n0} < d_{f0}$. The final depth limits are then the intersection of the limits from camera 0 and 1:

$$d_{n01} = \begin{cases} \max(d_n, d_{n0}) & \alpha \neq 0, \\ d_n & \alpha = 0, \end{cases}$$

$$d_{f01} = \begin{cases} \min(d_f, d_{f0}) & \alpha \neq 0, \\ d_n & \alpha = 0. \end{cases}$$

These depth limits may be calculated by the geometry unit 205 in order to identify whether one or both of the endpoints of the epipolar line lie within the viewable range of camera 0. If the camera working depths do not overlap, then $d_{n01} > d_{f01}$ and the epipolar line is not defined. In this case the geometry unit 205 may be configured to not look for a matching feature in image 0 for the feature of image 1 which corresponds to the epipolar line. This avoids unnecessary processing. Otherwise, the points $x_n = x(d_{n01})$ and $x_f = x(d_{f01})$ will not be behind camera 0 and at least part of the epipolar line will lie within the viewable range of camera 0.

Where one of $x_n$ or $x_f$ is in the plane containing the centre of camera 0 and parallel to the image plane of camera 0 (depth=0 relative to camera 0, the camera plane), that point projects to a point at infinity in image 0. This can only happen if $d_n=0$. Finding a meaningful value for $d_n$ therefore simplifies implementation.

Figure 9:
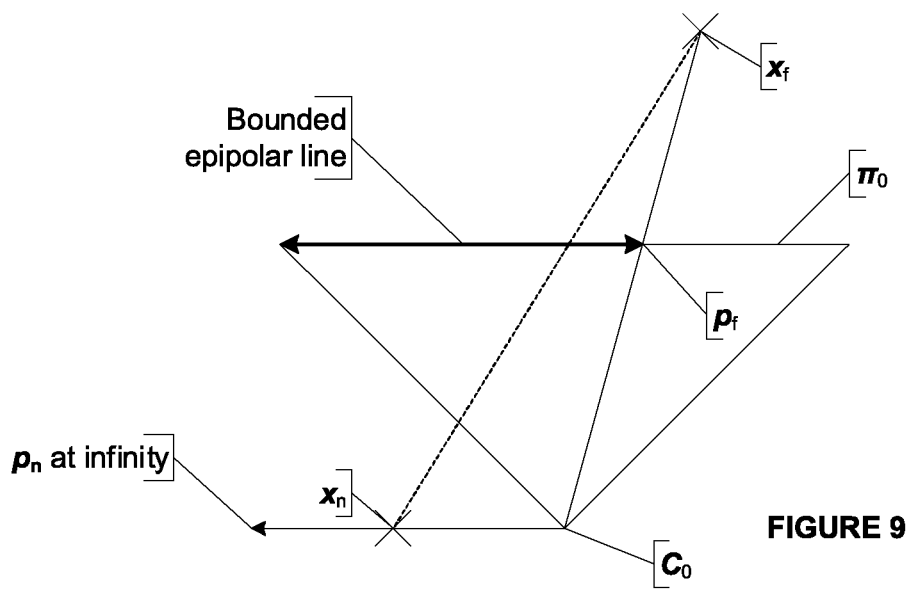
FIG. 9 is a schematic diagram of a bounded epipolar line formed in the image plane of a camera where one point is a finite point in front of the camera and the other is at depth 0 relative to the camera.

FIG. 9 illustrates the case where $x_n$ is on the camera plane of camera 0. The point on the camera plane projects to a point of the form $p=[x\ y\ 0]^T$. This can be interpreted as a direction vector in the image plane. As with i, if the sign is preserved correctly then this direction vector can be interpreted as pointing in one direction only. Where all of $x_n$, $x_f$, and the camera matrices are computed as listed above, then the sign will be correct.

Figure 10:
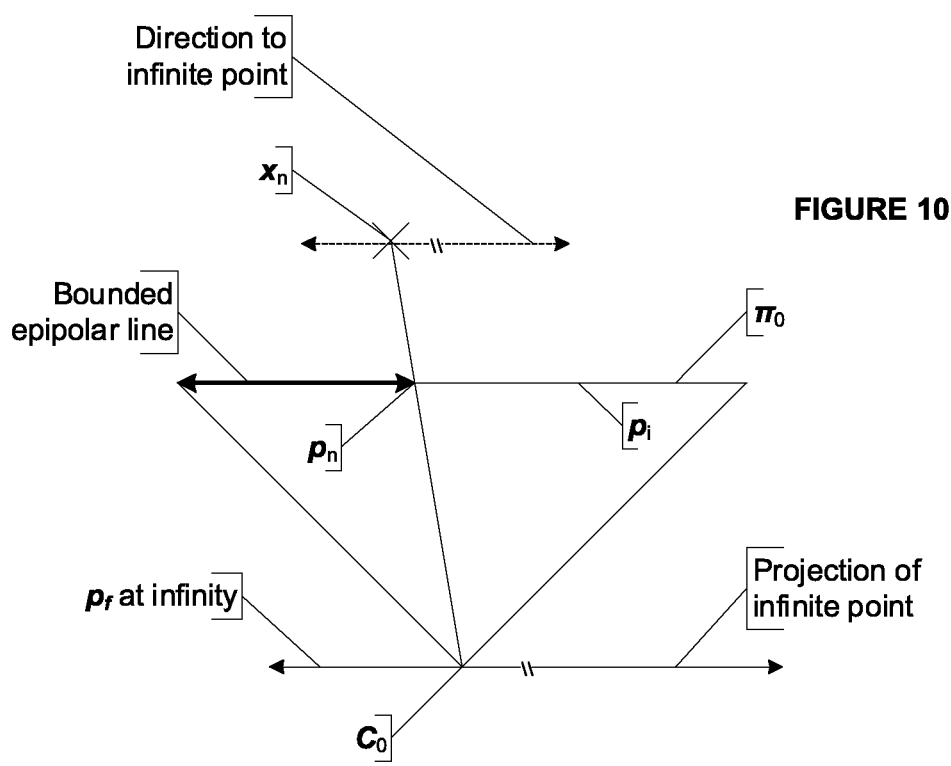
FIG. 10 is a schematic diagram of a bounded epipolar line formed in the image plane of a camera where the near point in camera 1 is a finite point in front of camera 0, the image plane containing x is parallel to the image plane of camera 0, and the far point of camera 1 is on the plane at infinity.

In the example of FIG. 9, the epipolar line extends from $p_f$ in the direction given by $p_n=[x\ y\ 0]^T$. Alternatively, $p_n$ may be finite and $p_f$ may be infinite, so that the line extends from $p_n$ in the direction given by $p_f$. FIG. 10 shows a special case that produces infinite $p_f$: the back-projection line of x is on a plane parallel to the image plane of camera 0 and $x_f$=i.

If x is collinear with $C_0$ and $C_1$, then the epipolar line reduces to the epipolar point $e_0=P_0C_1$ in image 0 and $p_1=e_1=P_1C_0$ in image 1. The depth of x cannot be resolved in this case and no geometrically-constrained region can be defined. In this case the match unit may be configured not to look for a match to the feature in image 0.

By forming an epipolar line that is bounded according to known depth constraints, the geometry unit may further reduce the size of the region where a feature identified in a first image is expected to be found in a second image related to the first by at least approximately known epipolar geometry. The geometry unit may derive a geometrically-constrained region based on the bounded epipolar line such that the geometrically-constrained region is itself bounded according to the established depth constraints. For example, the geometry unit may derive a geometrically-constrained region which comprises all points within a predefined distance of the bounded epipolar line.

The above example is just one way in which a bounded epipolar line may be formed. The geometry unit may be configured to form a bounded epipolar line in any manner, not limited to the particular examples given herein.

Coordinate Rotation

It can be advantageous to make use of a rotation in the image 0 coordinate system so as to map the epipolar line to be parallel to one of the coordinate axes. For example, the coordinate system could be mapped such that the epipolar line is parallel to the x-axis and is therefore "horizontal" in image 0. This simplifies the computation of the point-line distance to finding the y-offset between the line and point, and the depth constraints calculated above become limits on the x-coordinates. The epipolar line may be written as $l'=[a'\ b'\ c']$. It is a homogeneous quantity, so it can be scaled as desired. To make the sub-vector $[a\ b]$ a unit vector, the line is scaled according to, $$l=[a\ b\ c]=l'\sqrt{(a^2+b^2)^{-1}}.$$

Note that a line with a=b=0 is not valid, so this case does not need to be addressed. A rotation is desired that maps the line as follows, $$lR_l=[1\ 0\ c],$$

where $R_l$ has the form, $$R_l = \begin{bmatrix} r_c & -r_s & 0 \\ r_s & r_c & 0 \\ 0 & 0 & 1 \end{bmatrix},$$

$$r_c = \cos(\theta),$$

$$r_s = \sin(\theta).$$

Expanding and simplifying yields, $$\begin{bmatrix} a & b \\ b & -a \end{bmatrix}\begin{bmatrix} r_c \\ r_s \end{bmatrix} = \begin{bmatrix} 1 \\ 0 \end{bmatrix}.$$

Solving for $r_c$ and $r_s$ yields, $$\begin{bmatrix} r_c \\ r_s \end{bmatrix} = (a^2+b^2)^{-1}\begin{bmatrix} a & b \\ b & -a \end{bmatrix}\begin{bmatrix} 1 \\ 0 \end{bmatrix} = \begin{bmatrix} a \\ b \end{bmatrix},$$

$$\therefore R_l = \begin{bmatrix} a & -b & 0 \\ b & a & 0 \\ 0 & 0 & 1 \end{bmatrix}.$$

For a given epipolar line, this matrix can be used to rotate the coordinate system of an image in which a feature is sought so that the epipolar line is parallel to the x-axis. It can be advantageous for the geometry unit to perform such a rotation so as to simply subsequent use of the epipolar line. For example, since the perpendicular distance from the epipolar line is given by the y-value alone it becomes trivial to check which features detected in an image lie within a predefined distance of the epipolar line, e.g. for determining which features lie within a geometrically-constrained region.

The data processing system of FIG. 2 is shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing system described herein may be embodied in hardware on an integrated circuit. The data processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

There may be provided a method of manufacturing, at an integrated circuit manufacturing system, a data processing system as described herein. There may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 11.

Figure 11:
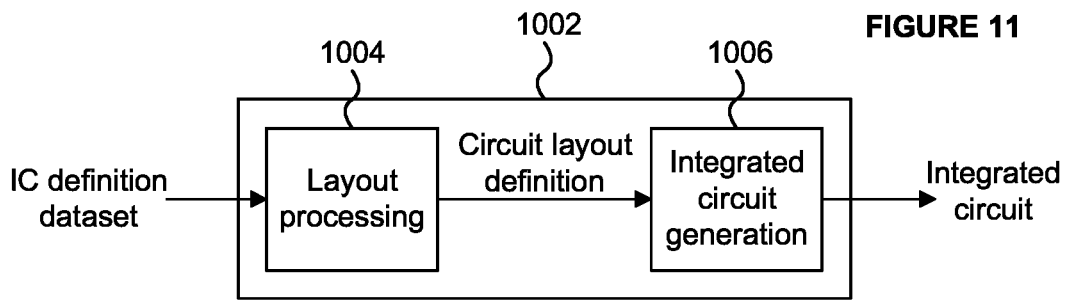
FIG. 11 is a schematic diagram of an integrated circuit manufacturing system.

FIG. 11 shows an example of an integrated circuit (IC) manufacturing system 1002 which is configured to manufacture a data processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1002 to manufacture an integrated circuit embodying a data processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of matching features identified in first and second images captured from respective camera viewpoints related by an epipolar geometry, each identified feature being described by a local descriptor, the method comprising:
    using the epipolar geometry to define a geometrically-constrained region in the second image corresponding to a first feature in the first image represented by a first local descriptor;
    comparing the first local descriptor with local descriptors of features in the second image, thereby determining respective measures of similarity between the first feature in the first image and the respective features in the second image;
    identifying, from the features located in the geometrically-constrained region in the second image, (i) a geometric best match feature to the first feature, and (ii) a geometric next-best match feature to the first feature;
    identifying, from any of the features in the second image, a global best match feature to the first feature;
    performing a first comparison of the measures of similarity determined for the geometric best match feature and for the global best match feature, with respect to a first threshold;
    performing a second comparison of the measures of similarity determined for the geometric best match feature and for the geometric next-best match feature, with respect to a second threshold; and
    in dependence on whether the first and second thresholds are satisfied, selecting the geometric best match feature in the second image as an output match to the first feature in the first image.

2. The computer-implemented method as claimed in claim 1, wherein the selecting comprises not providing an output match if either the first or second threshold is not satisfied.

3. The computer-implemented method as claimed in claim 1, wherein the first threshold is satisfied when, according to their respective similarity measures, the geometric best match feature is not worse than the global best match feature as a match to the first feature by an amount defined by a first predefined factor.

4. The computer-implemented method as claimed in claim 1, wherein the second threshold is satisfied when, according to their respective similarity measures, the geometric best match feature is better than the geometric next-best match feature as a match to the first feature by an amount defined by a second predefined factor.

5. The computer-implemented method as claimed in claim 1, wherein performing the first and second comparisons comprises calculating first and second ratios of the magnitudes of the respective measures of similarity, the first and second thresholds being satisfied if the respective ratios satisfy the first and second thresholds, respectively.

6. The computer-implemented method as claimed in claim 5, wherein the comparing the first local descriptor with local descriptors of features in the second image comprises forming descriptor distances between the first local descriptor and the respective local descriptor for each of said features in the second image, and the identifying geometric best match and next-best match features comprises identifying the shortest and next-shortest descriptor distances corresponding to features in the geometrically-constrained region in the second image.

7. The computer-implemented method as claimed in claim 6, wherein the identifying the global best match feature comprises identifying the shortest descriptor distance between the first local descriptor and the local descriptors of features in the second image not limited to those features lying in the geometrically-constrained region.

8. The computer-implemented method as claimed in claim 1, wherein each measure of similarity determined is a descriptor distance between the first local descriptor and the local descriptor of the respective feature of the second image.

9. The computer-implemented method as claimed in claim 8, wherein each local descriptor is a vector representing characteristics of pixels of the respective feature and determining each descriptor distance comprises performing a vector subtraction between the respective local descriptors and determining the magnitude of the resulting vector.

10. The computer-implemented method as claimed in claim 1, wherein said using the epipolar geometry to define a geometrically-constrained region in the second image comprises using the epipolar geometry to derive an epipolar line or area in the second image corresponding to the first feature in the first image, wherein the epipolar line or area is used to define the geometrically-constrained region.

11. The computer-implemented method as claimed in claim 10, wherein the geometrically-constrained region comprises all pixels of the second image within a predefined distance of the epipolar line or area.

12. The computer-implemented method as claimed in claim 11, wherein the predefined distance is determined in dependence on one or more measures of error in the epipolar geometry.

13. The computer-implemented method as claimed in claim 11, wherein the predefined distance is a predefined perpendicular distance to the epipolar line or boundary of the epipolar area which varies with position in the respective image in dependence on the epipolar geometry.

14. The computer-implemented method as claimed in claim 1, wherein each feature represents a localised set of pixels in the respective image and a feature is determined to be located in the geometrically-constrained region using one of more of the following determinations: determining whether any pixel represented by the feature lies in the geometrically-constrained region; determining whether one or more predetermined pixels represented by the feature lie in the geometrically-constrained region; determining whether a predetermined proportion of pixels represented by the feature lie in the geometrically-constrained region.

15. The computer-implemented method as claimed in claim 1, further comprising:
receiving camera data identifying limits on the viewable range from one or both of the camera viewpoints; and
processing the camera data so as to identify bounds on the geometrically-constrained region in the second image in accordance with the epipolar geometry.

16. The computer-implemented method as claimed in claim 15, wherein the camera data comprises for one or both camera viewpoints: depth information indicating nearest and/or furthest regions viewable from the camera viewpoint; field of view information indicating regions viewable from the camera viewpoint; a view frustum for the camera viewpoint; and
data indicating regions in front of and/or behind the camera viewpoint.

17. The computer-implemented method as claimed in claim 10, wherein the epipolar geometry is used to derive an epipolar line and the method further comprises transforming the coordinate system of the second image so as to map the epipolar line parallel to one of the coordinate axes and, subsequently in the transformed coordinate system, identifying the features located in the geometrically-constrained region in the second image.

18. The computer-implemented method as claimed in claim 1, further comprising:
using the epipolar geometry to define a second geometrically-constrained region in the first image corresponding to the geometric best match feature in the second image;
comparing the local descriptor of the geometric best match feature with local descriptors of features in the first image, thereby determining respective measures of similarity between the first feature in the first image and the respective features in the second image;
identifying, from the features located in the second geometrically-constrained region in the first image, (i) a second geometric best match feature to the geometric best match feature of the second image, and (ii) a second geometric next-best match feature to the geometric best match feature of the second image;
identifying, from any of the features in the first image, a second global best match feature to the geometric best match feature of the second image;
performing a first comparison of the measures of similarity determined for the second geometric best match feature and for the second global best match feature, with respect to the first threshold;
performing a second comparison of the measures of similarity determined for the second geometric best match feature and for the second geometric next-best match feature, with respect to the second threshold; and
in dependence on whether the first and second thresholds are satisfied, confirming the geometric best match feature in the second image as the output match to the first feature in the first image.

19. A data processing system for matching features identified in first and second images captured from respective camera viewpoints related by an epipolar geometry, each identified feature being described by a local descriptor, the data processing system comprising:

a geometry unit configured to use the epipolar geometry to define a geometrically-constrained region in the second image corresponding to a first feature in the first image represented by a first local descriptor;

a comparison unit configured to compare the first local descriptor with local descriptors of features in the second image thereby determining respective measures of similarity between the first feature in the first image and the respective features in the second image; and a match unit configured to:
  identify, from the features located in the geometrically-constrained region in the second image, (i) a geometric best match feature to the first feature, and (ii) a geometric next-best match feature to the first feature,
  identify, from any of the features in the second image, a global best match feature to the first feature,
  perform a first comparison of the measures of similarity determined for the geometric best match feature and for the global best match feature, with respect to a first threshold,
  perform a second comparison of the measures of similarity determined for the geometric best match feature and for the geometric next-best match feature, with respect to a second threshold, and
  in dependence on whether the first and second thresholds are satisfied, select the geometric best-match feature in the second image as an output match to the first feature in the first image.

20. A non-transitory computer readable storage medium having stored thereon computer readable instructions that, when executed at a computer system, cause the computer system to perform a method of matching features identified in first and second images captured from respective camera viewpoints related by an epipolar geometry, each identified feature being described by a local descriptor, the method comprising:

using the epipolar geometry to define a geometrically-constrained region in the second image corresponding to a first feature in the first image represented by a first local descriptor;

comparing the first local descriptor with local descriptors of features in the second image, thereby determining respective measures of similarity between the first feature in the first image and the respective features in the second image;

identifying, from the features located in the geometrically-constrained region in the second image, (i) a geometric best match feature to the first feature, and (ii) a geometric next-best match feature to the first feature;

identifying, from any of the features in the second image, a global best match feature to the first feature;

performing a first comparison of the measures of similarity determined for the geometric best match feature and for the global best match feature, with respect to a first threshold;

performing a second comparison of the measures of similarity determined for the geometric best match feature and for the geometric next-best match feature, with respect to a second threshold; and in dependence on whether the first and second thresholds are satisfied, selecting the geometric best match feature in the second image as an output match to the first feature in the first image.

* * * * *